United States Patent
Loges et al.

(10) Patent No.: US 9,416,021 B2
(45) Date of Patent: Aug. 16, 2016

(54) SYNTHESIS AND USE OF GYPSUM SEEDING MATERIAL

(71) Applicant: BASF Construction Solutions GmbH, Trostberg (DE)

(72) Inventors: Niklas Loges, Pittenhart (DE); Uwe Gehrig, St. Georgen (DE); Michael Schinabeck, Altenmarkt (DE); Frank Dierschke, Oppenheim (DE); Michael Bräu, Shanghai (CN); Luc Nicoleau, Altenmarkt (DE)

(73) Assignee: BASF Construction Solutions GmbH, Trostberg (DE)

( * ) Notice: Subject to any disclaimer, the term of this patent is extended or adjusted under 35 U.S.C. 154(b) by 0 days.

(21) Appl. No.: 14/399,604

(22) PCT Filed: Jun. 14, 2013

(86) PCT No.: PCT/EP2013/062328
§ 371 (c)(1),
(2) Date: Nov. 7, 2014

(87) PCT Pub. No.: WO2014/012720
PCT Pub. Date: Jan. 23, 2014

(65) Prior Publication Data
US 2015/0114268 A1    Apr. 30, 2015

(30) Foreign Application Priority Data
Jul. 20, 2012 (EP) .................................... 12177315

(51) Int. Cl.
| | |
|---|---|
| *C01F 11/46* | (2006.01) |
| *C04B 22/10* | (2006.01) |
| *C04B 22/14* | (2006.01) |
| *C04B 28/14* | (2006.01) |
| *C04B 40/00* | (2006.01) |
| C04B 103/12 | (2006.01) |
| C04B 111/00 | (2006.01) |

(52) U.S. Cl.
CPC ............... *C01F 11/46* (2013.01); *C04B 22/142* (2013.01); *C04B 22/143* (2013.01); *C04B 28/145* (2013.01); *C04B 40/0039* (2013.01); *C01P 2004/51* (2013.01); *C01P 2004/61* (2013.01); *C01P 2004/62* (2013.01); *C04B 2103/12* (2013.01); *C04B 2111/0062* (2013.01)

(58) Field of Classification Search
CPC .... C01F 11/46; C04B 22/143; C04B 2103/12
See application file for complete search history.

(56) References Cited

U.S. PATENT DOCUMENTS

| | | |
|---|---|---|
| 4,009,062 A | 2/1977 | Long |
| 6,409,825 B1 | 6/2002 | Yu et al. |
| 6,548,589 B2 | 4/2003 | Widmer et al. |
| 7,749,320 B2 | 7/2010 | Amirzadeh-Asl |
| 7,767,019 B2 | 8/2010 | Liu et al. |
| 7,776,462 B2 | 8/2010 | Liu et al. |
| 7,861,955 B2 | 1/2011 | Tracey et al. |
| 7,910,640 B2 | 3/2011 | Wieland et al. |
| 8,119,716 B2 | 2/2012 | Hardinghaus et al. |
| 8,142,915 B2 | 3/2012 | Blackburn et al. |
| 8,653,186 B2 | 2/2014 | Nicoleau et al. |
| 2006/0278127 A1 | 12/2006 | Liu et al. |

FOREIGN PATENT DOCUMENTS

| | | |
|---|---|---|
| DE | 10 2005 025 719 A1 | 12/2006 |
| EP | 1 136 507 A1 * | 9/2001 |
| WO | 2005/021632 A1 | 3/2005 |
| WO | 2006/042709 A1 | 4/2006 |
| WO | 2010/026155 A1 | 3/2010 |
| WO | WO 2010/026155 A1 * | 3/2010 |
| WO | 2010/040612 A1 | 4/2010 |
| WO | WO 2010/040612 A1 * | 4/2010 |

* cited by examiner

*Primary Examiner* — Robert Harlan
(74) *Attorney, Agent, or Firm* — Oblon, McClelland, Maier & Neustadt, L.L.P.

(57) ABSTRACT

The invention relates to a process for producing calcium sulphate dihydrate by reacting a water-soluble calcium compound with a water-soluble sulphate compound in the presence of water and a polymer containing acid groups, wherein the polymer containing acid groups comprises specific polyether groups. Additionally disclosed are calcium sulphate dihydrate producible by the process according to the invention, and the use thereof for production of gypsum plasterboard.

17 Claims, 6 Drawing Sheets

SYNTHESIS AND USE OF GYPSUM SEEDING MATERIAL

This application is a §371 of International Application No. PCT/EP2013/062328 filed Jun. 14, 2013, and claims priority from European Patent Application No. 12177315.4 filed Jul. 20, 2012.

The present invention relates to a process for producing calcium sulphate dihydrate and to the use thereof for production of gypsum plasterboard.

The term "gypsum" is used colloquially both for the compound calcium sulphate dihydrate and for the rock consisting of this compound, and the corresponding building material, calcium sulphate hemihydrate or anhydrite. Calcium sulphate dihydrate occurs naturally in large deposits which formed when oceans evaporated during the earth's history. In addition, calcium sulphate dihydrate is obtained as a product or by-product in various industrial processes, for example flue gas desulphurization, in which sulphur dioxide is depleted from the combustion offgases of coal-fired power plants by means of a calcium carbonate or calcium hydroxide slurry.

When heated to temperatures of 120-130° C., the calcium sulphate dihydrate releases a portion of the water of crystallization therein and is converted to calcium sulphate hemihydrate. When the hemihydrate is mixed with water, the dihydrate then reforms within a short time with hardening of the material.

Calcium sulphate hemihydrate is an important building material for production of mortars, screeds, casting moulds and particularly gypsum plasterboard. Due to technical requirements, considerably varying properties are demanded of calcium sulphate binders. Particularly with regard to processing time and the time at which hardening occurs, the binders must be variably adjustable over the period from a few minutes to several hours. In order to satisfy these requirements, the use of setting-regulating additives is necessary.

Of crucial significance is the acceleration of setting in the production of gypsum slabs, especially gypsum plasterboard. At present, more than 8000 million $m^2$ of gypsum plasterboard per year are produced globally. The production of gypsum plasterboard has long been known. It is described, for example, in U.S. Pat. No. 4,009,062. The settable gypsum slurry composed of calcium sulphate hemihydrate and water used is typically produced in a flow mixer at high speed, applied continuously to a cardboard sheet and covered with a second piece of cardboard. The two cardboard sheets are referred to as the front and back boards. The line of boards then moves along what is called a setting belt, and almost complete conversion of the settable calcium sulphate phases to calcium sulphate dihydrate must have taken place at the end of the setting belt. After this hardening, the sheet is individualized into boards and the water still present in the boards is removed in heated multistage dryers.

Such gypsum plasterboard is used on a large scale for interior roofs and walls.

In order to meet rising demand and to minimize production costs, efforts are constantly being made to improve the production process. Modern plants for fabrication of gypsum slabs can reach manufacturing rates of up to 180 meters per minute. The greatest possible exploitation of the plant capacity is possible only through the use of high-efficiency accelerators. The setting time of the calcium sulphate hemihydrate here determines the time until the gypsum plasterboard can be cut and hence the length and the speed of the conveyor belt, and hence the production rate. In addition, the hydration has to be complete before the boards are exposed to high temperatures in the dryer. Otherwise, the strength potential of the binder is inadequately utilized and the risk of volume expansion arises as a result of post-hydration on ingress of moisture.

There is therefore a considerable economic interest in accelerating the setting operation.

The setting accelerator used nowadays in the industrial production of gypsum plasterboard is ground calcium sulphate dihydrate, a large portion of the particles used being in the region of 1 μm. For the continuous operation of gypsum plasterboard production, marked stability of the accelerating action of the ground calcium sulphate dihydrate is of crucial significance. The production of a setting accelerator which is equally effective over a prolonged period, however, still presents great technical problems. The effectiveness of ground calcium sulphate dihydrate, especially in the presence of air humidity, decreases within a short time. In addition, the ground calcium sulphate dihydrate can be used only in powder form since introduction into water leads immediately to the dissolution of the finest particles, which are crucial for the setting acceleration. The thesis by Müller ("Die Abbindebeschleunigung von Stuckgips durch Calciumsulfatdihydrat" [The acceleration of the setting of plaster of paris by calcium sulphate dihydrate], ISBN 978-3-899-58-328-1) discloses that precipitated calcium sulphate dihydrate is unsuitable as a setting accelerator, and good acceleration of setting can be achieved only by grinding calcium sulphate dihydrate, in which case both the amount of ultrafine particles in the nanometer range and the crystal lattice damage caused in the grinding are important for the efficacy.

A further accelerator also used in addition to ground calcium sulphate dihydrate is potassium sulphate. However, this has the disadvantage that it leads to a distinct decrease in the final compressive strength of the products produced.

In the production of gypsum plasterboard, the pulverulent ground calcium sulphate dihydrate is introduced into the flow mixer, since only at this point is homogeneous mixing of the setting accelerator with the calcium sulphate hemihydrate ensured. This, however, has the disadvantage that the setting accelerator already leads to encrustation in the mixer and in the pipelines which conduct the gypsum slurry to the cardboard sheet. The encrustations have to be removed at regular time intervals in a highly laborious manner with shutdowns in production.

WO 2005/021632 discloses a process for producing fine inorganic solids by precipitation of the fine inorganic solids from solutions. The surface of the fine inorganic solids is coated here with at least one dispersant. The inorganic solids disclosed include precipitated calcium sulphate among many other compounds, while the dispersants used are, for example, acrylate or methacrylate copolymers and the salts, polyphosphates and modified fatty acid derivatives thereof.

It was therefore an object of the present invention to provide a setting accelerator for calcium sulphate hemihydrate and anhydrite, which, as well as very good setting acceleration, has marked storage stability and thus also enables a stable process regime in gypsum plasterboard production.

This object was achieved by a process for producing calcium sulphate dihydrate by reacting a water-soluble calcium compound with a water-soluble sulphate compound in the presence of water and a polymer containing acid groups, wherein the polymer containing acid groups comprises polyether groups of the structural unit (I)

(I)

where
* indicates the bonding site to the polymer containing acid groups,

U represents a chemical bond or an alkylene group having 1 to 8 carbon atoms,

X is oxygen or an $NR^1$ group, k is 0 or 1, n is an integer with a mean, based on the polymer containing acid groups, in the range from 3 to 300, Alk is $C_2$-$C_4$-alkylene, where Alk may be the same or different within the (Alk-O)$_n$ group, W is a hydrogen, $C_1$-$C_6$-alkyl or aryl radical or is the Y—F group where Y is a linear or branched alkylene group which has 2 to 8 carbon atoms and may bear a phenyl ring, F is a nitrogen-bonded 5- to 10-membered nitrogen heterocycle which may have, as ring members, as well as the nitrogen atom and as well as carbon atoms, 1, 2 or 3 additional heteroatoms selected from oxygen, nitrogen and sulphur, where the nitrogen ring members may have an $R^2$ group, and where 1 or 2 carbon ring members may be in the form of carbonyl groups, $R^1$ is hydrogen, $C_1$-$C_4$-alkyl or benzyl, and $R^2$ is hydrogen, $C_1$-$C_4$-alkyl or benzyl.

It has been found here, surprisingly, that the calcium sulphate dihydrate produced by the process according to the invention has excellent efficacy as a setting accelerator for calcium sulphate hemihydrate and anhydrite. Particularly surprising in this context was the very good storage stability of the aqueous products obtained, which are preferably in the form of suspensions. Storage of the product over several months also does not lead to any change in the setting acceleration. It was additionally surprising that it is also possible to dry the calcium sulphate dihydrate suspensions obtained in accordance with the invention and to use the resulting powders as setting accelerators, in which case the powders, based on the amount of calcium sulphate dihydrate, have setting acceleration comparable to the inventive suspensions, and likewise good storage stability.

It is essential to the invention that the inventive polymer comprises an acid group. The term "acid group" in the present application is understood to mean both the free acid and the salts thereof. The acid may preferably be at least one from the group of carboxyl, phosphono, sulphino, sulpho, sulphamido, sulphoxy, sulphoalkyloxy, sulphinoalkyloxy and phosphonooxy group. Particular preference is given to carboxyl and phosphonooxy groups.

Useful water-soluble calcium compounds and water-soluble sulphate compounds in each case are in principle also only comparatively sparingly water-soluble compounds, although preference is given to compounds which have good water solubility and dissolve completely or virtually completely in water in each case. However, it has to be ensured that reactivity sufficient for the reaction exists in an aqueous environment with the appropriate reactant, i.e. the water-soluble calcium compound and the water-soluble sulphate compounds. Preferably the water-soluble calcium compound has a solubility of 0.01 to 8 mol/l, preferably 0.1 to 5 mol/l, especially 0.5 to 3 mol/l in water and the water-soluble sulphate compound has a solubility of 0.01 to 8 mol/l, preferably 0.1 to 5 mol/l, especially 0.5 to 3 mol/l in water.

In a preferred embodiment, in a first step, the water-soluble sulphate compound is mixed with water and the polymer containing acid groups, such that a mixture preferably in the form of a solution is obtained, to which, in a subsequent second step, the water-soluble calcium compound is added, preferably as a solution. More particularly, the water-soluble calcium compound and the water-soluble sulphate compound can be used as aqueous solutions in the following concentrations:

i) 0.1 to 6 mol/l, preferably 0.5 to 2 mol/l, especially 0.6 to 1 mol/l, of the sulphate compound, ii) 0.1 to 10 mol/l, preferably 3 to 8 mol/l, especially 4 to 6 mol/l, of the calcium compound.

The aqueous mixture may, as well as water, also comprise one or more further solvents. The reaction of the water-soluble calcium compound with the water-soluble sulphate compound is preferably conducted in the presence of water and a polymer containing acid groups at a temperature between 5 and 25° C. Higher temperatures lead to poorer efficacy of the setting accelerator.

The water-soluble calcium compound is especially at least one from the group of calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium hypochloride, calcium iodate, calcium iodide, calcium lactate, calcium nitrite, calcium oxalate, calcium phosphate, calcium propionate, calcium sulphide, calcium tartrate, calcium thiocyanate and calcium aluminate.

The water-soluble calcium compound is preferably at least one from the group of calcium chloride, calcium nitrate, calcium thiocyanate, calcium acetate and calcium formate.

The water-soluble sulphate compound is especially at least one from the group of ammonium sulphate, magnesium sulphate, sodium sulphate, potassium sulphate, lithium sulphate, rubidium sulphate, caesium sulphate, sodium hydrogensulphate, potassium hydrogensulphate, lithium hydrogensulphate, rubidium hydrogensulphate, caesium hydrogensulphate and sulphuric acid.

The water-soluble sulphate compound is preferably at least one from the group of ammonium sulphate, magnesium sulphate, sodium sulphate, potassium sulphate, lithium sulphate, rubidium sulphate and caesium sulphate.

In a particularly preferred embodiment, the polymer containing acid groups is a polycondensation product comprising
(II) a structural unit having an aromatic or heteroaromatic system and a polyether group of the formula (I) and
(III) a phosphated structural unit having an aromatic or heteroaromatic system.

The structural units (II) and (III) are preferably represented by the following general formulae where A is the same or different and is represented by a substituted or unsubstituted, aromatic or heteroaromatic compound having 5 to 10 carbon atoms in the aromatic system, where the further radicals are as defined for structural unit (I);

where

D is the same or different and is represented by a substituted or unsubstituted, aromatic or heteroaromatic compound having 5 to 10 carbon atoms in the aromatic system.

In addition, E is the same or different and is represented by N, NH or O, m=2 if E=N and m=1 if E=NH or O.

$R^3$ and $R^4$ are the same or different and are each independently represented by a branched or unbranched $C_1$- to $C_{10}$-alkyl radical, $C_5$- to $C_8$-cycloalkyl radical, aryl radical, heteroaryl radical or H, preferably by H, methyl, ethyl or phenyl, more preferably by H or methyl and especially preferably by H. In addition, b is the same or different and is represented by an integer from 0 to 300. If b=0, E=O.

The polycondensation product preferably contains a further structural unit (IV) which is represented by the following formula (IV)

where

Y is the same or different and is independently represented by (II), (III) or further constituents of the polycondensation product.

$R^5$ and $R^6$ are preferably the same or different and are represented by H, $CH_3$, COOH or a substituted or unsubstituted, aromatic or heteroaromatic compound having 5 to 10 carbon atoms. In this context, $R^5$ and $R^6$ in structural unit (IV) are preferably each independently represented by H, COOH and/or methyl.

In a particularly preferred embodiment, $R^5$ and $R^6$ are each represented by H.

The molar ratio of the structural units (II), (III) and (IV) of the inventive phosphated polycondensation product can be varied within wide ranges. It has been found to be appropriate that the molar ratio of the structural units [(II)+(III)]:(IV) is 1:0.8 to 3, preferably 1:0.9 to 2 and more preferably 1:0.95 to 1.

The molar ratio of the structural units (II):(III) is normally 1:10 to 10:1, preferably 1:7 to 5:1 and more preferably 1:5 to 3:1.2.

The A and D groups in the structural units (II) and (III) of the polycondensation product are usually represented by phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, preferably phenyl, where A and D may be selected independently of one another and may also each consist of a mixture of the compounds mentioned. The X and E groups are preferably each independently represented by O.

Preferably, n in structural unit (I) is represented by an integer from 5 to 280, especially 10 to 160 and more preferably 12 to 120, and b in structural unit (III) by an integer from 0 to 10, preferably 1 to 7 and more preferably 1 to 5. The respective radicals, the length of which is defined by n and b, may consist here of uniform component groups, but it may also be appropriate that they are a mixture of different component groups. In addition, the radicals of the structural units (II) and (III) may each independently have the same chain length, in which case n and b are each represented by a number. However, it will generally be appropriate that mixtures with different chain lengths are involved in each case, such that the radicals of the structural units in the polycondensation product have different numerical values for n and, independently, for b.

In a particular embodiment, the present invention further envisages that a sodium, potassium, ammonium and/or calcium salt and preferably a sodium and calcium salt of the phosphated polycondensation product is involved.

Frequently, the inventive phosphated polycondensation product has a weight-average molecular weight of 4000 g/mol to 150 000 g/mol, preferably 10 000 to 100 000 g/mol and more preferably 20 000 to 75 000 g/mol.

With regard to the phosphated polycondensation products for use with preference in accordance with the present invention, and the preparation thereof, reference is also made to patent applications WO 2006/042709 and WO 2010/040612, the contents of which are hereby incorporated into the application.

In a further preferred embodiment, the polymer containing acid groups is at least one copolymer obtainable by polymerizing a mixture of monomers comprising
(V) at least one ethylenically unsaturated monomer comprising at least one radical from the group of carboxylic acid, carboxylic salt, carboxylic ester, carboxamide, carboxylic anhydride and carboximide
and
(VI) at least one ethylenically unsaturated monomer with a polyether group of structural unit (I).

The copolymers according to the present invention contain at least two monomer units. However, it may also be advantageous to use copolymers with three or more monomer units.

In a preferred embodiment, the ethylenically unsaturated monomer (V) is represented by at least one of the following general formulae from groups (Va), (Vb) and (Vc):

In the mono- or dicarboxylic acid derivative (Va) and the monomer (Vb) in cyclic form, where Z=O (acid anhydride) or $NR^7$ (acid imide), $R^7$ and $R^9$ are each independently hydrogen or an aliphatic hydrocarbyl radical having 1 to 20 carbon atoms, preferably a methyl group. B is H, $-COOM_a$, $-CO-O(C_qH_{2q}O)_r-R^9$, $-CO-NH-(C_qH_{2q}O)_r-R^9$.

M is hydrogen, a mono- or divalent metal cation, preferably a sodium, potassium, calcium or magnesium ion, or else ammonium or an organic amine radical, and a=½ or 1, according to whether M is a mono- or divalent cation. The organic amine radicals used are preferably substituted ammonium groups which derive from primary, secondary or tertiary $C_{1-20}$-alkylamines, $C_{1-20}$-alkanolamines, $C_{5-8}$-cycloalkylamines and $C_{6-14}$-arylamines. Examples of the corresponding amines are methylamine, dimethylamine, trimethylamine, ethanolamine, diethanolamine, triethanolamine, methyldiethanolamine, cyclohexylamine, dicyclohexylamine, phenylamine, diphenylamine in the protonated (ammonium) form.

$R^9$ is hydrogen, an aliphatic hydrocarbyl radical having 1 to 20 carbon atoms, a cycloaliphatic hydrocarbyl radical having 5 to 8 carbon atoms, an aryl radical having 6 to 14 carbon atoms which may optionally also be substituted, q=2, 3 or 4 and r=0 to 200, preferably 1 to 150. The aliphatic hydrocarbons here may be linear or branched and saturated or unsaturated. Preferred cycloalkyl radicals are considered to be cyclopentyl or cyclohexyl radicals, and preferred aryl radicals to be phenyl or naphthyl radicals, which may especially also be substituted by hydroxyl, carboxyl or sulpho groups.

The following formula represents the monomer (Vc):

$R^{10}$ and $R^{11}$ here are each independently hydrogen or an aliphatic hydrocarbyl radical having 1 to 20 carbon atoms, a cycloaliphatic hydrocarbyl radical having 5 to 8 carbon atoms, an optionally substituted aryl radical having 6 to 14 carbon atoms. Q may be the same or different and is represented by NH, $NR^9$ or O, where $R^9$ is as defined above.

In addition, $R^{12}$ is the same or different and is represented by $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_mH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OP_3H_2$ and $(C_nH_{2n})$—$NR^{14}{}_2$ where n=0, 1, 2, 3 or 4.

$R^{13}$ is H, —$COOM_a$, —CO—O($C_qH_{2q}O$)$_r$—$R^9$, —CO—NH—($C_qH_{2q}O$)$_r$—$R^9$, where $M_a$, $R^9$, q and r are each as defined above.

$R^{14}$ is hydrogen, an aliphatic hydrocarbyl radical having 1 to 10 carbon atoms, a cycloaliphatic hydrocarbyl radical having 5 to 8 carbon atoms, an optionally substituted aryl radical having 6 to 14 carbon atoms.

In a particularly preferred embodiment the ethylenically unsaturated monomer (VI) is represented by the following general formula in which each radical is as defined above.

With regard to the process according to the invention, based on the calcium sulphate dihydrate, preferably between 0.005 and 100% by weight, especially between 0.01 and 50% by weight, especially preferably between 0.02 and 30% by weight, more preferably between 0.03 and 15% by weight and most preferably between 0.05 and 10% by weight of the polymer containing acid groups is used.

The present invention further provides calcium sulphate dihydrate producible by the process according to the invention.

The present invention also provides for the use of calcium sulphate dihydrate, produced by reaction of a water-soluble calcium compound with a water-soluble sulphate compound in the presence of water and a polymer containing acid groups for production of gypsum plasterboard.

Especially preferably, the polymers containing acid groups may be the polymers which have polyether groups of structural unit (I) and are used in the process according to the invention. It is, however, additionally possible also to use at least one polymer containing acid groups from the group of polyacrylic acid, polymethacrylic acid, polyvinylphosphonic acid, and copolymers comprising acrylic acid, methacrylic acid, vinylsulphonic acid, 2-acrylamido-2-methylpropane-sulphonic acid and vinylphosphonic acid. Especially preferred are polyacrylic acid, polymethacrylic acid and polyvinylphosphonic acid.

More particularly, based on the calcium sulphate hemihydrate used in the production of the gypsum plasterboard, 0.0001 to 1% by weight, preferably 0.001 to 0.5% by weight and especially preferably 0.005 to 0.2% by weight of calcium sulphate dihydrate is used.

In a particularly preferred embodiment, the calcium sulphate dihydrate obtained by reaction of a water-soluble calcium compound with a water-soluble sulphate compound in the presence of water and a polymer containing acid groups is used in the form of an aqueous suspension, particularly as obtainable directly from the process according to the invention, for production of gypsum plasterboard. The inventive calcium sulphate dihydrate suspension preferably contains between 0.1 and 3.0 mol/l, especially between 0.3 and 1.5 mol/l and more preferably between 0.6 and 1.0 mol/l of calcium sulphate dihydrate. It is particularly advantageous here that the gypsum slurry used for production of the gypsum plasterboard cannot be contacted with the inventive calcium sulphate dihydrate until after application to the cardboard sheet, the calcium sulphate dihydrate being used in the form of an aqueous suspension. The use of a calcium sulphate dihydrate suspension achieves easy applicability and a very good homogeneous distribution in the gypsum slurry. It is particularly advantageous in this context that encrustation of the flow mixer and of the pipelines which conduct the gypsum slurry to the cardboard sheet can be substantially avoided. The cleaning intervals of a continuous plant are drastically prolonged as a result.

It is a further advantage that the compressive strength of the gypsum plasterboard is not affected or even improved by the use of the calcium sulphate dihydrate according to the invention.

For the production of gypsum plasterboard the calcium sulphate dihydrate obtained by reaction of a water-soluble calcium compound with a water-soluble sulphate compound in the presence of water and a polymer containing acid groups can be added at different stages of the production process. Preferably the calcium sulphate dihydrate according to the invention is applied at least on one of the surfaces of the cardboard sheets, in particular in the form of an aqueous suspension, to which the gypsum slurry is subsequently applied. In a further embodiment it is also possible to add the calcium sulphate dihydrate according to the invention in the production process of the cardboard sheets.

For the production of gypsum plasterboard the calcium sulphate dihydrate according to the invention can also be added to the flow mixer, directly after the flow mixer, to the batching water, to the foam and/or to the stucco preparation before it is added to the flow mixer.

In a preferred embodiment the calcium sulphate dihydrate according to the invention is used in combination with calcium sulfate dihydrate powder, preferably in a finely ground form, for the production of gypsum plasterboard.

The present invention further provides a process for producing a gypsum plasterboard, wherein 0.0001 to 1% by weight of the calcium sulphate dihydrate as obtainable directly from the process according to the invention, based on the calcium sulphate hemihydrate used in the production of the gypsum plasterboard, is used. Preferably the gypsum slurry used for production of the gypsum plasterboard is not contacted with the calcium sulphate dihydrate until after application to the cardboard sheet, the calcium sulphate dihydrate being used in the form of an aqueous suspension.

The examples which follow illustrate the advantages of the present invention.

EXAMPLES

Polymer Synthesis

Synthesis of the Comb Polymer Containing Phosphoric Ester:

A glass reactor equipped with a stirrer, thermometer, pH electrode and several feed devices is initially charged with 180 g of deionized water and heated to a polymerization start temperature of 80° C. (initial charge). In a separate feed vessel, 4669 g of a 25.7% purified aqueous methyl polyethylene glycol (5000) methacrylate (MPEG5000 methacrylate) solution are mixed with 297.6 g of hydroxyethyl methacrylate phosphate (HEMA phosphate) and 190.2 g of a 20% NaOH solution (corresponds to solution A). In a further separate feed vessel, 13.71 g of sodium peroxodisulphate are mixed with 182.1 g of water (solution B). In a third feed, 13.2 g of 2-mercaptoethanol and 39.6 g of deionized water are used to prepare a 25% solution (solution C).

After production of solution A, B and C, the addition of all three solutions to the stirred initial charge is commenced simultaneously.

After the addition has ended, the temperature is left at 80° C. for a further 30 minutes, then the solution is allowed to cool and neutralization to pH 7.3 is effected with 50% sodium hydroxide solution. The resulting copolymer is obtained as a clear solution which has a solids content of 27.8%. The mean molecular weight of the copolymer is Mw 39 000 g/mol, Mp 34 000 g/mol, and the polydispersity is 1.55.

Synthesis of the Phosphated Polycondensation Product:

A heatable reactor equipped with a stirrer is charged with 17.8 parts of polyphosphoric acid and heated to 90° C. Within 15 min, 30.7 parts of phenoxyethanol are metered in while stirring. After 60 min, 445 parts of poly(ethylene oxide) monophenyl ether (mean molecular weight 5000 g/mol), 34.8 parts of concentrated methanesulphonic acid, 14.16 parts of paraformaldehyde and 23.2 parts of water are added. The reaction mixture is heated to 105° C. while stirring for a further 6 hours. It is then allowed to cool and neutralized to pH 7 with 50% sodium hydroxide solution. The condensation product has a mean molecular weight $M_w$ of approx. 22 000 g/mol (determined by GPC).

Description of the Further Polymers Used:

The comb polymer Melflux 2650 L is a commercially available polycarboxylate ether from BASF Construction Polymers GmbH. The polymer is based on the monomers maleic acid, acrylic acid, vinyloxybutyl polyethylene glycol—5800. $M_w$=36 000 g/mol, determined by GPC; the solids content of the solution is 33%.

Production of the Calcium Sulphate Dihydrate

INVENTIVE EXAMPLES

Chemicals used: calcium chloride (anhydrous): Sigma-Aldrich>97%; magnesium sulphate heptahydrate: Merck>99%.

Example 1

A solution of 44.4 g of calcium chloride (anhydrous, 0.4 mol) in 75 g of water is added to a solution of 52.9 g of ammonium sulphate (0.4 mol) and 0.93 g of the above-described phosphated polycondensation product (based on active content of polymer) in 282 g of water. The resulting suspension is stirred with an axial stirrer at 800 revolutions per minute for 1 hour.

Example 2

A solution of 44.4 g of calcium chloride (anhydrous, 0.4 mol) in 75 g of water is added to a solution of 98.6 g of magnesium sulphate heptahydrate (0.4 mol) and 0.46 g (based on active content of polymer) of the above-described comb polymer containing phosphoric ester in 282 g of water. The resulting suspension is stirred with an axial stirrer at 800 revolutions per minute for 1 hour.

Example 3

A solution of 44.4 g of calcium chloride (anhydrous, 0.4 mol) in 75 g of water is added to a solution of 57.6 g of ammonium sulphate (0.42 mol) and 0.93 g of the above-described phosphated polycondensation product (based on active content of polymer) in 282 g of water. The resulting suspension is stirred with an axial stirrer at 800 revolutions per minute for 1 hour.

Example 4

A solution of 44.4 g of calcium chloride (anhydrous, 0.4 mol) in 75 g of water is added to a solution of 52.9 g of ammonium sulphate (0.4 mol) and 4.63 g MVA 2650 L (based on active content of polymer) in 282 g of water. The resulting suspension is stirred with an axial stirrer at 800 revolutions per minute for 1 hour.

Example 5

A solution of 44.4 g of calcium chloride (anhydrous, 0.4 mol) in 75 g of water is added to a solution of 98.6 g of magnesium sulphate heptahydrate (0.4 mol) and 0.93 g of a polyacrylic acid ($M_w$=2500 g/mol) in 282 g of water. The resulting suspension is stirred with an axial stirrer at 800 revolutions per minute for 1 hour.

COMPARATIVE EXAMPLES

Example 6

A solution of 44.4 g of calcium chloride (anhydrous, 0.4 mol) in 75 g of water is added to a solution of 98.6 g of magnesium sulphate heptahydrate (0.4 mol) in 282 g of water. The resulting suspension is stirred with an axial stirrer at 800 revolutions per minute for 1 hour.

Also used as comparative examples were two samples of ground calcium sulphate dihydrate which are used commercially in the production of gypsum plasterboard. These are referred to hereinafter as sample 1 and sample 2.

Physical Properties of the Samples Used

While the accelerators based on the ground calcium sulphate dihydrate used (sample 1 and sample 2) have relatively large particles, the particle sizes of the suspensions produced in accordance with the invention are much smaller (cf. Table 1). It can also be seen that the nature of the polymer (cf. Examples 1 to 4 and Example 5) and the presence of polymer (Example 6 compared to Examples 1 to 5) play a very major role for the particle sizes and the performance properties (cf. Table 1 and Table 3).

TABLE 1

Particle size distributions for samples 1 and 2 (ground calcium sulphate dihydrate) and of the samples described in Examples 1 to 6.

|  | d(0.1)/µm | d(0.5)/µm | d(0.9)/µm |
|---|---|---|---|
| Reference: sample 1 | 0.833 | 12.542 | 125.452 |
| Reference: sample 2 | 0.674 | 4.176 | 32.200 |
| Example 1 | 0.134 | 0.180 | 0.248 |
| Example 2 | 0.140 | 0.194 | 0.701 |
| Example 3 | 0.136 | 0.182 | 0.253 |
| Example 4 | 0.136 | 0.181 | 0.251 |
| Example 5 | 2.452 | 10.148 | 21.901 |
| Example 6 | 1.579 | 6.473 | 18.505 |

Figure 5:
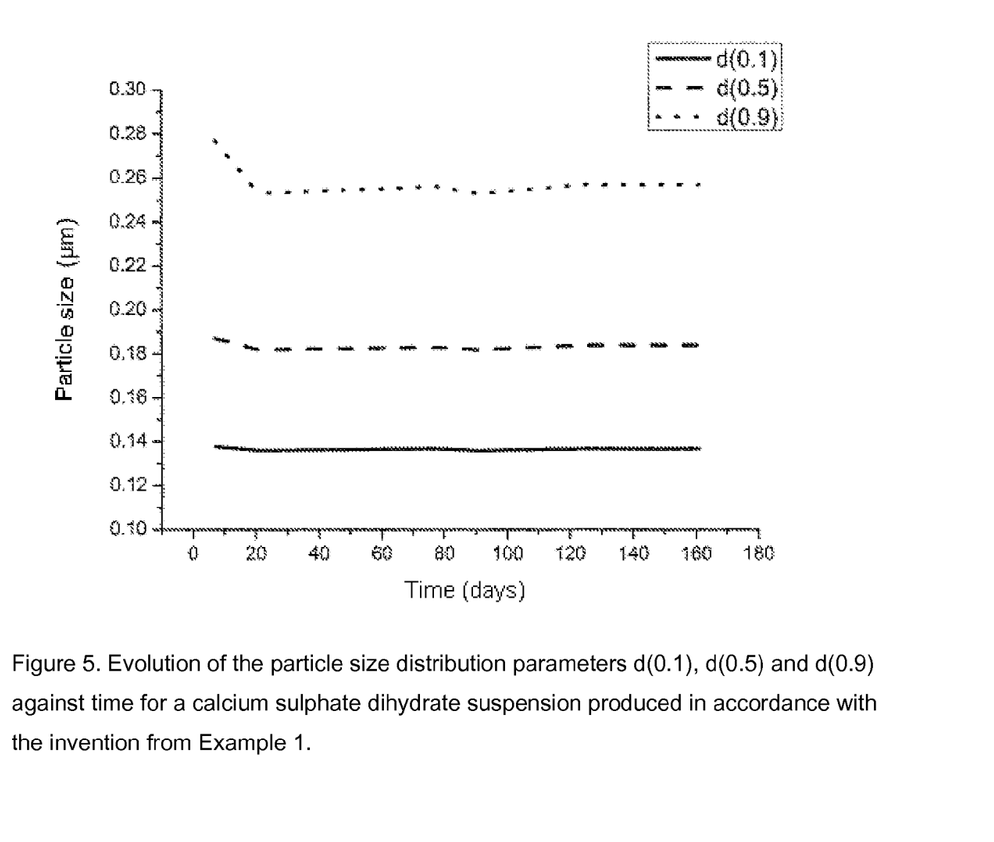
Figure 5. Evolution of the particle size distribution parameters d(0.1), d(0.5) and d(0.9) against time for a calcium sulphate dihydrate suspension produced in accordance with the invention from Example 1.

The inventive calcium sulphate dihydrate suspensions exhibit a very stable particle size distribution over a long period. FIG. 5 shows the characteristic data for the particle size distribution (measured by means of static light scattering with a Malvern Mastersizer 2000) of a calcium sulphate dihydrate suspension produced in accordance with the invention. It can be seen that the particle sizes are virtually unchanged over a period of at least 160 days. This behaviour is also reflected in the use test: the performance remains constant over the period examined.

Use Tests

The performance of samples 1 and 2 of ground calcium sulphate dihydrate and of the accelerators based on calcium sulphate dihydrate suspensions produced in accordance with the invention was tested in various ways:

By Heat Flux Calorimetry

Since pure calcium sulphate hemihydrate exhibits too high a reactivity to be studied by heat flux calorimetry, the reaction is first retarded. For the analysis, 40 g of calcium sulphate hemihydrate (Sigma-Aldrich, >97%) are admixed with a mixture of 15 g of water and 25 g of a 0.056% solution of a calcium salt of an N-polyoxymethylene amino acid (Retardan P from Sika AG). The resulting mixture is stirred with an axial stirrer at 750 revolutions per minute for 60 seconds. In a subsequent pause for 30 seconds, the accelerator is added and then the mixture is stirred once again with an axial stirrer at 750 revolutions per minute for 30 seconds. The heat flux is recorded with a TAM Air calorimeter (TA Instruments).

Figure 1:
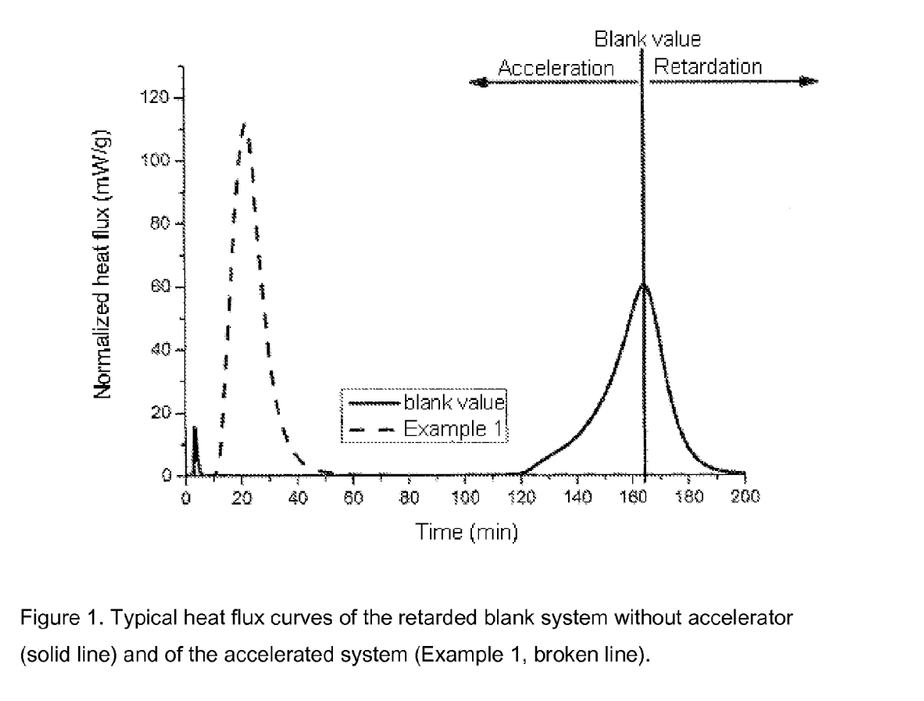
Figure 1. Typical heat flux curves of the retarded blank system without accelerator (solid line) and of the accelerated system (Example 1, broken line).

The performance of the accelerators is assessed in two ways (the heat flux curves are shown in FIG. 1):
(i) Shift in the time t of maximum heat flux. In the example, the heat flux maximum is shifted from 164 min without accelerator (=$t_{blank}$) to 22 min (Example 1=$t_{sample}$), from which the acceleration factor $a_t$ is calculated as follows:

$$a_t = \frac{t_{blank} - t_{sample}}{t_{blank}}$$

Thus, for the example cited:

$$a_t = \frac{164\ min - 22\ min}{164\ min} = 0.87 = 87\%$$

(ii) Change in the slope (steepness) s of the maximum heat flux peak. In the example cited, the slope of the image value is 2.42 and that of the system admixed with the accelerator from Example 1 0.0374. The acceleration factor $a_s$ is calculated from:

$$a_s = \frac{s_{sample}}{s_{blank}} - 1$$

For the example cited:

$$a_s = 0.794/0.152 - 1 = 4.22 = 422\%$$

In Use Tests 300 g of β-hemihydrate (REA) are first prehomogenized with 0.05 g of Retardan P, sprinkled into 198 g of water and then left to stand for 15 seconds. Thereafter, the stirring with the Hobart mixer starts at level II (285 revolutions per minute) for a further 15 seconds. During this time, the accelerator is added rapidly. After filling a cylinder (h=10 cm, d=5 cm) which is raised after 60 seconds, the slump is determined. The setting time is determined by what is called the knife-cut method (to DIN EN 13279-2).

A comparison of the results for a standard accelerator (sample 1) and for an accelerator produced in accordance with the invention (Example 1) are compiled in Table 2.

If the accelerator is not added until the end of mixing, the same setting times are observed for accelerators produced in accordance with the invention as in the case of early addition. The standard accelerators exhibit much poorer acceleration in the case of later addition (cf. Table 2).

TABLE 2

Comparison of performance data for a standard accelerator (sample 1) and an accelerator produced in accordance with the invention (Example 1)

| w/g | Accelerator | Accelerator dosage (g) | Retardan P (g) | Slump ASTM (cm) | Setting time (min:s) |
|---|---|---|---|---|---|
| 0.66 | Standard accelerator, early dosage | 0.2 | 0.05 | 19.7 | 4:10 |
| 0.66 | Standard accelerator, late dosage | 0.2 | 0.05 | 19.8 | 5:15 |
| 0.66 | Example 1 | 0.2 | 0.05 | 18.4 | 1:50 |

Results

Figure 2A:
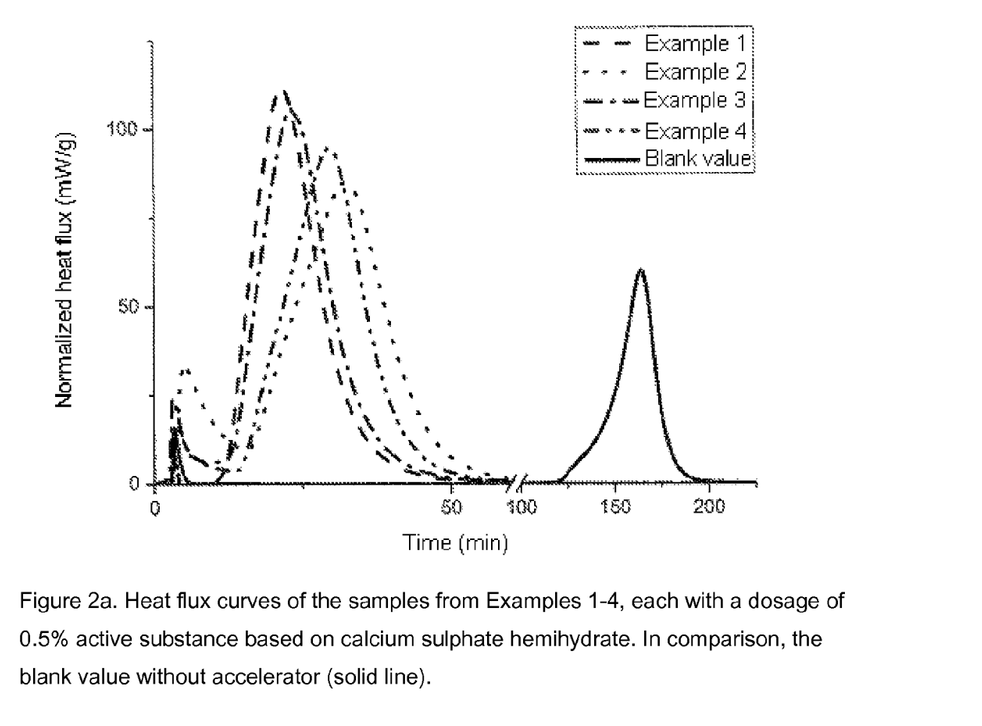
Figure 2a. Heat flux curves of the samples from Examples 1-4, each with a dosage of 0.5% active substance based on calcium sulphate hemihydrate. In comparison, the blank value without accelerator (solid line).
Figure 2B:
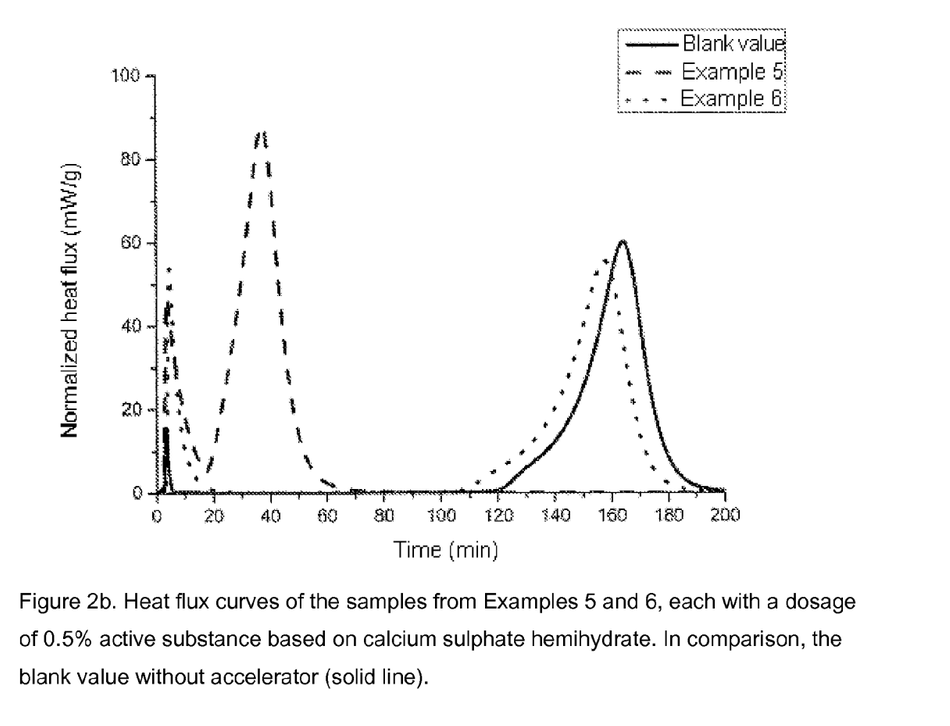
Figure 2b. Heat flux curves of the samples from Examples 5 and 6, each with a dosage of 0.5% active substance based on calcium sulphate hemihydrate. In comparison, the blank value without accelerator (solid line).
Figure 3:
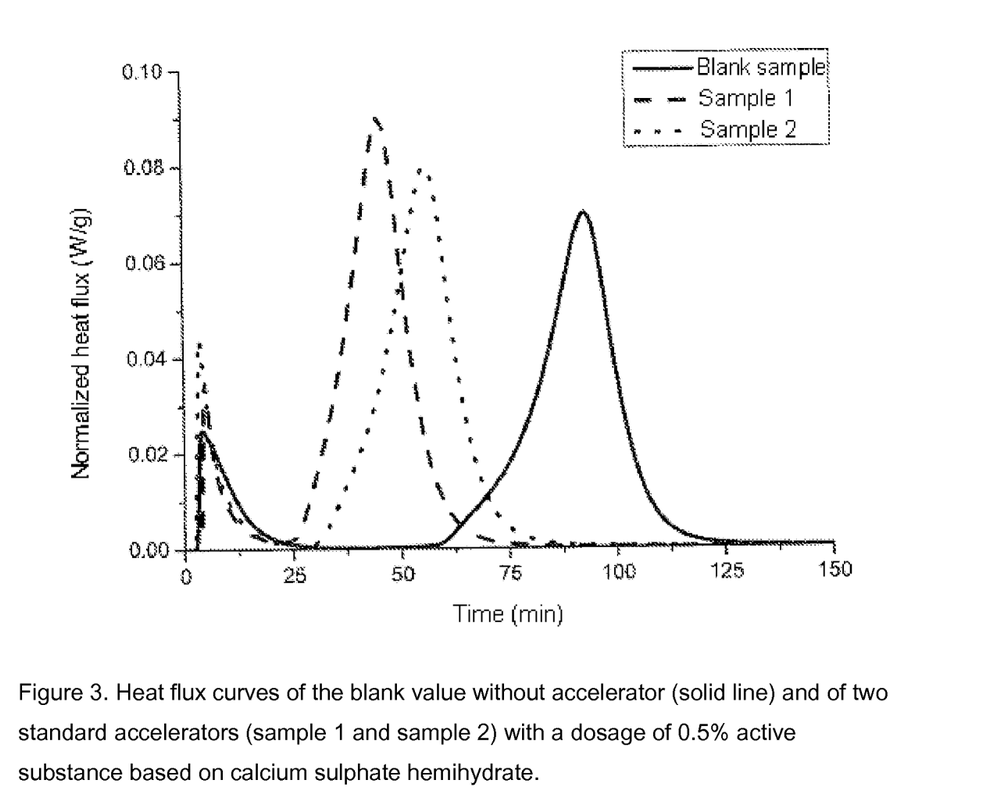
Figure 3. Heat flux curves of the blank value without accelerator (solid line) and of two standard accelerators (sample 1 and sample 2) with a dosage of 0.5% active substance based on calcium sulphate hemihydrate.

The performance data of the calcium sulphate dihydrate suspensions from Examples 1 to 6 and of samples 1 and 2 are summarized in Table 3, and shown as graphs in FIGS. 2a and 2b for Examples 1 to 6. For comparison, FIG. 3 shows the heat flux curves of the standard accelerators (samples 1 and 2). For each of the calorimetry studies, 0.5% of active substance based on calcium sulphate hemihydrate was used, and for each of the use tests for determination of the setting time 0.067%.

TABLE 3

Summary of the performance data for two standard accelerators (sample 1 and sample 2) based on ground calcium sulphate dihydrate and for the suspensions from Examples 1 to 6. For the setting time, the time and the acceleration relative to the mean of the times for the two standard accelerators are reported in each case).

|  | $a_t$ (%) | $a_s$ (%) | Setting time (min:s; %) |
|---|---|---|---|
| Reference: sample 1 | 51 | 56 | 4:20; 0% |
| Reference: sample 2 | 39 | 24 | 3:50; 0% |
| Example 1 | 87 | 422 | 1:50; 55% |

TABLE 3-continued

Summary of the performance data for two standard accelerators (sample 1 and sample 2) based on ground calcium sulphate dihydrate and for the suspensions from Examples 1 to 6. For the setting time, the time and the acceleration relative to the mean of the times for the two standard accelerators are reported in each case).

|  | $a_t$ (%) | $a_s$ (%) | Setting time (min:s; %) |
|---|---|---|---|
| Example 2 | 75 | 109 | 2:15; 45% |
| Example 3 | 84 | 350 | 1:50; 55% |
| Example 4 | 79 | 84 | 2:55; 30% |
| Example 5 | 76 | 107 | 2:15; 45% |
| Example 6 | 4 | 3 | 8:15; −100% |

It is clear from the table that, in the case of the same dosage with the gypsum suspensions produced in accordance with the invention, a much better result can be achieved. Considering the dosage necessary to obtain a particular setting time, only approx. 15% of the dosage of calcium sulphate dihydrate is needed in the case of use of the inventive suspensions, compared to the standard accelerators, for example sample 1 or sample 2.

Figure 4:
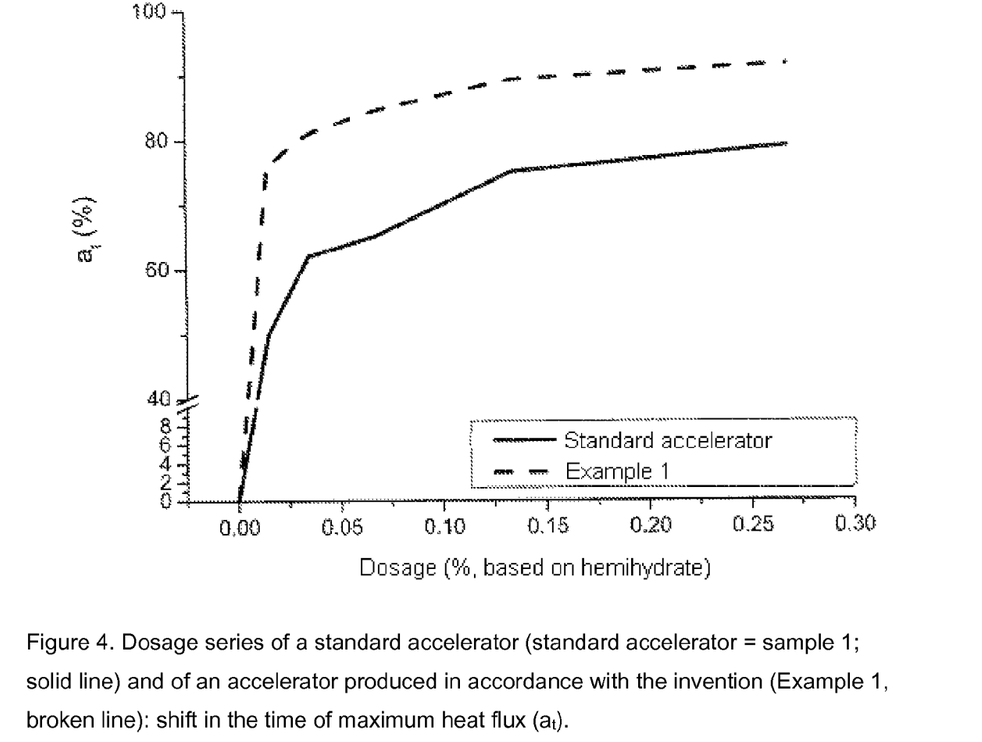
Figure 4. Dosage series of a standard accelerator (standard accelerator = sample 1; solid line) and of an accelerator produced in accordance with the invention (Example 1, broken line): shift in the time of maximum heat flux ($a_t$).

The dosage curve of a standard accelerator based on ground calcium sulphate dihydrate (sample 1) is shown in FIG. 4. It is clear that a particular acceleration cannot be exceeded since any further dosage beyond a particular amount of accelerator shows barely any further effect or none at all.

For comparison, a dosage curve for a suspension produced in accordance with the invention (Example 1) is shown. A much higher dosage efficiency and a significantly higher maximum performance are evident.

The invention claimed is:

1. A process for producing calcium sulphate dehydrate comprising the steps of reacting a water-soluble calcium compound with a water-soluble sulphate compound in the presence of water and a polymer containing acid groups, wherein the polymer containing acid groups comprises polyether groups of the structural unit (I)

*—U—(C(O))$_k$—X-(AlkO)$_n$—W  (I)

wherein;
* is a bonding site to the polymer containing acid groups;
U is a chemical bond or an alkylene group having 1 to 8 carbon atoms;
X is oxygen or an NR$^1$ group;
k is 0 or 1;
n is an integer with a mean, based on the polymer containing acid groups, in the range from 3 to 300;
Alk is $C_2$-$C_4$-alkylene, wherein Alk may be the same or different within the (Alk-O)$_n$ group;
W is a hydrogen, $C_1$-$C_6$-alkyl or aryl radical or is the Y—F group;
Y is a linear or branched alkylene group which has 2 to 8 carbon atoms and may bear a phenyl ring; and
F is a nitrogen-bonded 5- to 10-membered heterocycle containing a nitrogen which may have, as ring members, as well as the nitrogen atom and as well as carbon atoms, 1, 2 or 3 additional heteroatoms selected from oxygen, nitrogen and sulphur; wherein the nitrogen ring members may have an R$^2$ group, wherein 1 or 2 carbon ring members may be in the form of carbonyl groups;
R$^1$ is hydrogen, $C_1$-$C_4$-alkyl or benzyl; and
R$^2$ is hydrogen, $C_1$-$C_4$-alkyl or benzyl.

2. A process according to claim 1, wherein the acid group of the polymer is at least one group selected from the group consisting of a carboxyl group, a phosphono group, a sulphino group, a sulpho group, a sulphamido group, a sulphoxy group, a sulphoalkyloxy group, a sulphinoalkyloxy group and a phosphonooxy group.

3. A process according to claim 1, wherein the polymer containing acid groups is a polycondensation product containing
(II) a structural unit having an aromatic or heteroaromatic system and a polyether group of the formula (I), and
(III) a phosphated structural unit having an aromatic or heteroaromatic system.

4. A process according to claim 3, wherein the structural units (II) and (III) are represented by the following formulae A-U—(C(O))$_k$—X-(AlkO)$_n$—W  (II)

wherein
A is the same or different and is represented by a substituted or unsubstituted, aromatic or heteroaromatic compound having 5 to 10 carbon atoms in the aromatic system, wherein the further radicals are as defined for structural unit (I);

wherein
D is the same or different and is a substituted or unsubstituted, aromatic or heteroaromatic compound having 5 to 10 carbon atoms in the aromatic system;
E is the same or different and is represented by N, NH or O;
m=2 if E=N and m=1 if E=NH or O;
wherein R$^3$ and R$^4$ are the same or different and are each independently represented by a branches or unbranched $C_1$- to $C_{10}$-alkyl radical, $C_5$- to $C_8$-cycloalkyl radical, aryl radical, heteroaryl radical or H; and
b is the same or different and is represented by an integer from 0 to 300.

5. A process according to claim 3, wherein the polycondensation product contains a further structural unit (IV) of the formula wherein Y is the same or different and is independently represented by (II), (III) or further constituents of the polycondensation product.

6. A process according to claim 1, wherein the polymer containing acid groups is at least one copolymer obtained by polymerizing a mixture of monomers comprising
(V) at least one ethylenically unsaturated monomer comprising at least one radical from the group consisting of carboxylic acid, carboxylic salt; carboxylic ester, carboxamide, and
(VI) at least one ethylenically unsaturated monomer with a polyether group of structural unit (I).

7. A process according to claim 6, wherein the ethylenically unsaturated monomer (V) is represented by at least one of the following general formulae of groups ($V_a$), ($V_b$) and ($V_c$)

(Va)

(Vb)

wherein
R$^7$ and R$^8$ are each independently hydrogen or an aliphatic hydrocarbyl radical having 1 to 20 carbon atoms;
B is H, —COOM$_a$, —CO—O(C$_q$H$_{2q}$O)$_r$—R$^9$, —CO—NH—(C$_q$H$_{2q}$O)$_r$—R$^9$;
M is hydrogen, a mono- or divalent metal cation, an ammonium ion or an organic amine radical;
a is ½ or 1;
R$^9$ is hydrogen, an aliphatic hydrocarbyl radical having 1 to 20 carbon atoms, a cycloaliphatic hydrocarbyl radical having 5 to 8 carbon atoms, an optionally substituted aryl radical having 6 to 14 carbon atoms;
q for each (C$_q$H$_{2q}$O) unit is the same or different and is independently 2, 3 or 4;
r is 0 to 200;
Z is O, NR$^3$, or (V$_c$)

(Vc)

wherein
R$^{10}$ and R$^{11}$ are each independently hydrogen or an aliphatic hydrocarbyl radical having 1 to 20 carbon atoms, a cycloaliphatic hydrocarbyl radical having 5 to 8 carbon atoms, or an optionally substituted aryl radical having 6 to 14 carbon atoms;
R$^{12}$ is the same or different and is represented by (C$_n$H$_{2n}$)—SO$_3$H wherein n=0, 1, 2, 3 or 4, (C$_n$H$_{2n}$)—OH wherein n=0, 1, 2, 3 or 4; (C$_n$H$_{2n}$)—PO$_3$H$_2$ wherein n=0, 1, 2, 3 or 4, (C$_n$H$_{2n}$)—OPO$_3$H$_2$ wherein n=0, 1, 2, 3 or 4, (C$_6$H$_4$)—SO$_3$H, (C$_6$H$_4$)—PO$_3$H$_2$, (C$_6$H$_4$)—OPO$_3$H$_2$ and (C$_n$H$_{2n}$)—NR$^{14}{}_b$ wherein n=0, 1, 2, 3 or 4 and b=2 or 3;
R$^{13}$ is H, —COOM$_a$, —CO—O(C$_q$H$_{2q}$O)$_r$—R$^9$, —CO—NH—(C$_q$H$_{2q}$O)$_r$—R$^9$, wherein M$_a$, R$^9$, q and r are each as defined above;
R$^{14}$ is hydrogen, an aliphatic hydrocarbyl radical having 1 to 10 carbon atoms, a cycloaliphatic hydrocarbyl radical having 5 to 8 carbon atoms, an optionally substituted aryl radical having 6 to 14 carbon atoms;

Q is the same or different and is represented by NH, NR$^{15}$ or O; and
R$^{15}$ is an aliphatic hydrocarbyl radical having 1 to 10 carbon atoms, a cycloaliphatic hydrocarbyl radical having 5 to 8 carbon atoms or an optionally substituted aryl radical having 6 to 14 carbon atoms.

8. A process according to claim 6, wherein the ethylenically unsaturated monomer (VI) is of formula (VI)

wherein each radical is as defined as above.

9. A process according to claim 7, wherein the ethylenically unsaturated monomer (VI) is of formula (VI)

wherein each radical is as defined above.

10. A process according to claim 1, wherein, based on calcium sulphate dihydrate, between 0.005 and 100% by weight of the polymer containing acid groups is used.

11. A process according to claim 1, wherein, in a first step, the water-soluble sulphate compound is mixed with water and the polymer containing acid groups, to which, in a subsequent second step, the water-soluble calcium compound is added.

12. A process according to claim 1, wherein the water-soluble calcium compound and the water-soluble sulphate compound are provided as aqueous solutions in the following concentrations:
i) 0.1 to 6 mol/l of the sulphate compound;
ii) 0.1 to 10 mol/l of the calcium compound.

13. The calcium sulphate dihydrate produced by the process according to claim 1.

14. Gypsum plasterboard comprising the ca dehydrate of claim 13.

15. Gypsum plasterboard according to claim 14, containing 0.0001 to 1% by weight of the calcium sulphate dehydrate.

16. A process for producing a gypsum plasterboard, wherein 0.0001 to 1% by weight of the calcium sulphate dihydrate produced according to claim 1, based on the calcium sulphate hemihydrate used during production, is used.

17. A process according to claim 16, wherein a gypsum slurry used for production of the gypsum plasterboard is not contacted with the calcium sulphate dihydrate until after application to the cardboard sheet, wherein the calcium sulphate dehydrate is in the form of an aqueous suspension.

* * * * *